United States Patent
Saunders (10) Patent No.: US 8,046,367 B2
(45) Date of Patent: Oct. 25, 2011

(54) TARGETED DISTRIBUTION OF SEARCH INDEX FRAGMENTS OVER A WIRELESS COMMUNICATION NETWORK

(75) Inventor: Thomas J. Saunders, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 11/894,361

(22) Filed: Aug. 20, 2007

(65) Prior Publication Data

US 2009/0055387 A1 Feb. 26, 2009

(51) Int. Cl.
*G06F 7/00* (2006.01)
(52) U.S. Cl. .......................... 707/741; 707/711
(58) Field of Classification Search .................. 707/711, 707/713, 741
See application file for complete search history.

(56) References Cited

U.S. PATENT DOCUMENTS

| | | | |
|---|---|---|---|
| 6,638,314 B1 * | 10/2003 | Meyerzon et al. | 715/234 |
| 2006/0023945 A1 * | 2/2006 | King et al. | 382/173 |
| 2007/0016476 A1 * | 1/2007 | Hoffberg et al. | 705/14 |
| 2007/0162481 A1 * | 7/2007 | Millett | 707/101 |

* cited by examiner

*Primary Examiner* — Belix M Ortiz (57) ABSTRACT

Identifying portions of an index related to prior search requests sent from a wireless data processing device and transmitting the portions of the index to the wireless data processing device to be used for local searches. Specifically, a method according to one embodiment comprises: collecting information related to a plurality of content located over a network; automatically generating and continually updating an index for the plurality of content as new content is identified; analyzing search requests transmitted from a wireless data processing device; based on the analysis, identifying portions of the index relevant to the search requests; transmitting the portions of the index to the wireless data processing device; and executing subsequent search requests using the portions of the index stored on the wireless data processing device.

21 Claims, 6 Drawing Sheets

TARGETED DISTRIBUTION OF SEARCH INDEX FRAGMENTS OVER A WIRELESS COMMUNICATION NETWORK

TECHNICAL FIELD

This application relates generally to the field of data processing systems. More particularly, this application relates to an improved architecture for generating and distributing search indexes over a wireless communication network.

BACKGROUND

A "search engine" is an information retrieval system designed to help locate data stored on a computer system or a network of computer systems such as on the World Wide Web. The search engine allows a user to request content meeting specific criteria and generates a list of items that match those criteria. The list is often sorted with respect to some measure of relevance of the search results.

Figure 1:
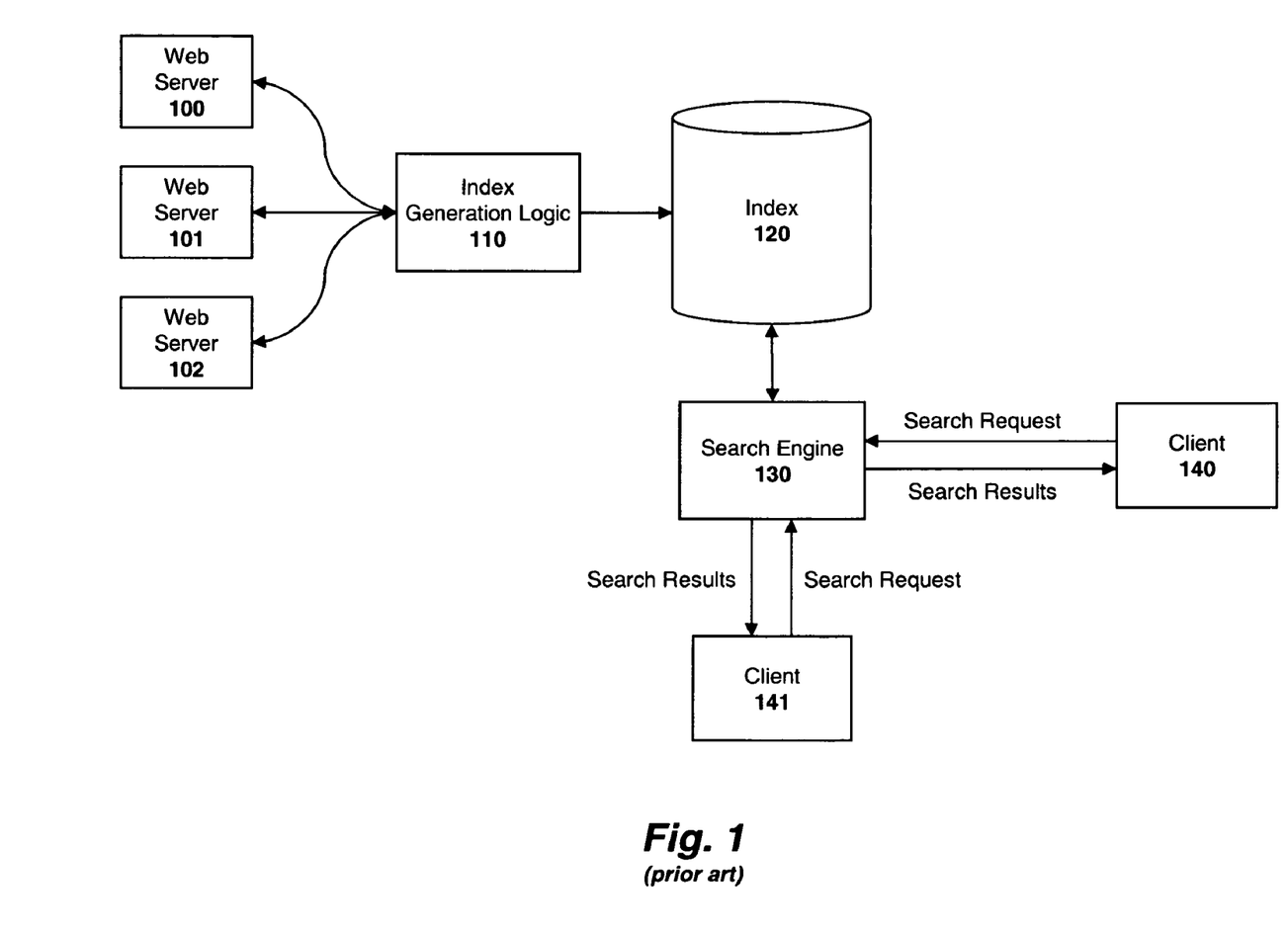
FIG. 1 illustrates an architecture of a prior art search engine and index.

As illustrated in FIG. 1, search engines 130 use search "indexes" 120 to operate quickly and efficiently. In operation, index generation logic 110 continually updates the index 120 using information gathered from Web servers 100-102 (or other types of servers). One well known form of index generation logic 110 is a "Web crawler" (also known as a "Web spider" or "Web robot"), a program or automated script that browses the World Wide Web in a methodical, automated manner and extracts text and metadata from Web pages to generate the index 120.

Figure 2:
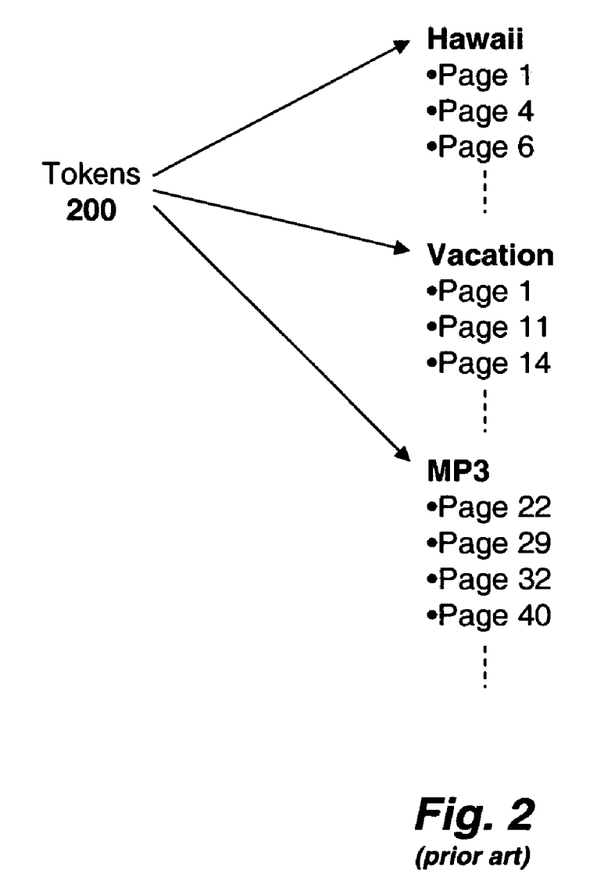
FIG. 2 illustrates the manner in which tokens are arranged in an exemplary inverted index.

An "inverted index" is a specific form of index 120 used by many popular search engines today such as Yahoo® and Google®. As illustrated in FIG. 2 an inverted index is built from "tokens" 200 which represent text strings and other forms of information (e.g., XML tags, multimedia content) extracted from Web pages. Each token entry within the inverted index includes a listing of Web pages in which the token appears. In FIG. 2, for example, Web pages 1, 4 and 6 include the token "Hawaii;" Web pages 1, 11 and 14 include the token "vacation;" and Web pages 22, 29, 32 and 40 include the token "MP3." The Web page entries may be ordered under each token based on the relevance of the Web pages (e.g., from most to least relevant).

The inverted index dramatically improves the speed with which the search engine 130 performs searches. For example, rather than searching each individual Web page for a specified text string or group of strings submitted by clients 140, 141, the search engine 130 simply identifies tokens which are relevant to the search and provides the Web pages associated with those tokens.

Given the continually growing number of computers and portable data processing devices connected to the Internet, current search engines require a significant amount of computing power. Accordingly, what is needed is a more efficient strategy for performing searches using an index.

SUMMARY

Identifying portions of an index related to prior search requests sent from a wireless data processing device and transmitting the portions of the index to the wireless data processing device to be used for local searches, is described. Specifically, a method according to one embodiment comprises: collecting information related to a plurality of content located over a network; automatically generating and continually updating an index for the plurality of content as new content is identified; analyzing search requests transmitted from a wireless data processing device; based on the analysis, identifying portions of the index relevant to the search requests; transmitting the portions of the index to the wireless data processing device; and executing subsequent search requests using the portions of the index stored on the wireless data processing device.

BRIEF DESCRIPTION OF THE DRAWINGS

A better understanding of targeted distribution of search index fragments over a wireless communication network can be obtained from the following detailed description in conjunction with the following drawings, in which.

DETAILED DESCRIPTION

Throughout the description, for the purposes of explanation, numerous specific details are set forth in order to provide a thorough understanding, yet it will be apparent, to one skilled in the art that targeted distribution of search index fragments over a wireless communication network may be practiced without some of these specific details. In other instances, well-known structures and devices are shown in block diagram form to avoid obscuring any underlying principles.

Embodiments of a Data Processing Service

Figure 3:
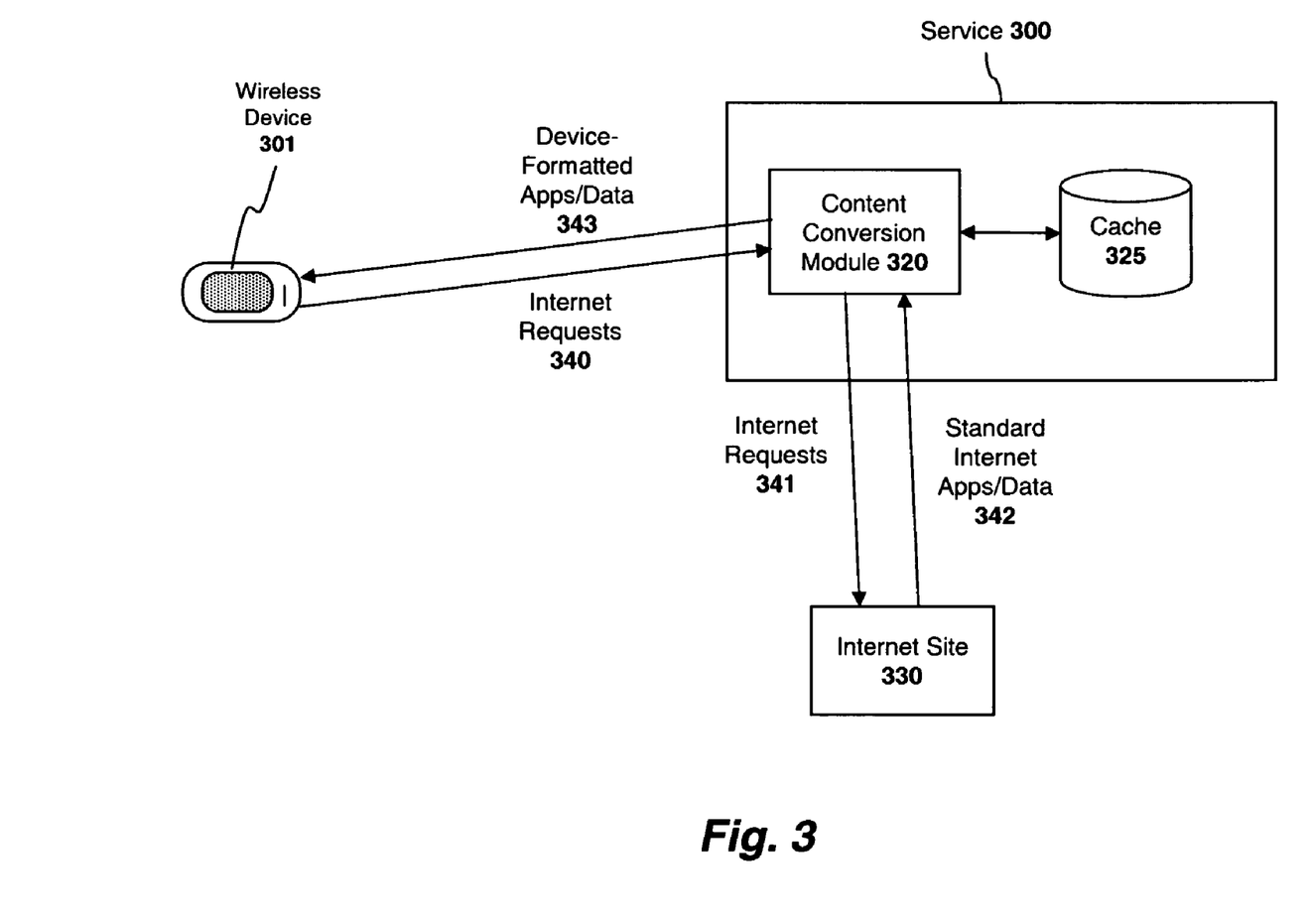
FIG. 3 illustrates a service employed in one embodiment.

Embodiments of the invention may be implemented on a wireless device 310 which communicates with a data processing service 300 as illustrated generally in FIG. 3. Embodiments of a service 300 and data processing device 310 are described, for example, in co-pending application entitled SYSTEM AND METHOD FOR INTEGRATING PERSONAL INFORMATION MANAGEMENT AND MESSAGING APPLICATIONS, Ser. No. 10/262,298, filed Sep. 30, 2002, and embodiments of dynamically managing presence and contact information on a data processing device 310 are described in co-pending application entitled SYSTEM AND METHOD FOR DYNAMICALLY MANAGING PRESENCE AND CONTACT INFORMATION, Ser. No. 10/611,019, filed Jun. 30, 2003 (hereinafter "co-pending applications"), which are assigned to the assignee of the present application and which are incorporated herein by reference.

Certain features of the service 300 will now be described followed by a detailed description of the system and method for distributing targeted search indexes over a wireless network. It should be noted, however, that the specific data processing device and system architecture described in the co-pending applications are not required for implementing the underlying principles of the invention.

In one embodiment, the service 300 converts standard applications and data into a format which each wireless communication device 310 can properly interpret. Thus, as illustrated in FIG. 3, one embodiment of the service 300 includes content conversion logic 320 for processing requests for Internet content 340 from a wireless communication device 310. More particularly, the service 300 acts as a proxy for the data processing device 310, forwarding Internet requests 340, 341 to the appropriate internet site 330 on behalf of the wireless communication device 310, receiving responses from the internet site 330 in a standard format, and converting the responses 324 into a format which the wireless communication device 310 can process (e.g., bytecodes).

For example, the conversion logic 320 may include a rendering module (not shown) for interpreting HTML code and translating that code into a format capable of being processed/rendered on the wireless communication device 310. As described in the prior applications, in one embodiment, the device-specific format comprises bytecodes/applets which, in one embodiment, are a form of Java bytecodes/applets. However, the conversion logic 320 may generate various other types of interpreted and/or non-interpreted code, depending on the particular type of wireless communication device 310 being used (e.g., one with an interpreter module or one without).

Because one embodiment of the service 300 maintains an intimate knowledge of the capabilities/configuration of each data processing device 310 (e.g., screen size, graphics/audio capabilities, available memory, processing power, user preferences, . . . etc) it can reconstruct the requested data accurately, while at the same time minimizing the bandwidth required to transmit the content to the device 310. For example, the conversion logic 320 may perform pre-scaling and color depth adjustments to the requested content so that it will be rendered properly within the data processing device's 310's display. In making these calculations, the conversion may factor in the memory and processing power available on the data processing device 310. In addition, the conversion logic 320 may compress the requested content using a variety of compression techniques, and thereby preserve network bandwidth.

New Embodiments of a System and Method for Distributing Targeted Search Indexes Over a Wireless Network One embodiment of the service 100 monitors searches submitted from each data processing device and responsively generates a subset of the complete search index (referred to herein as an "index fragment") based on the subject-matter of the prior searches. The service then transmits the index fragments to each of the data processing devices where they are used to perform searches locally, thereby conserving network bandwidth and data processing resources on the service 100.

Figure 4:
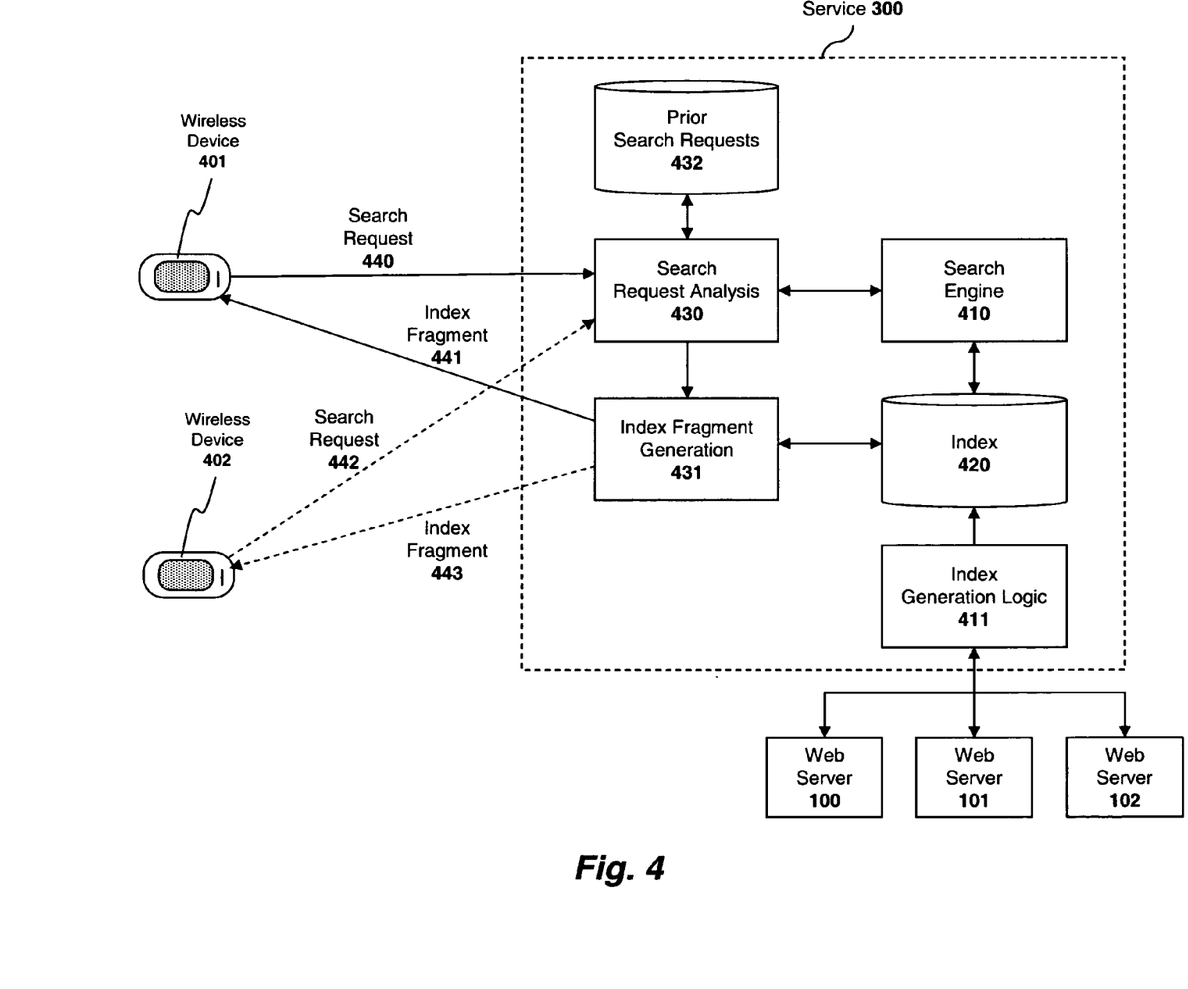
FIG. 4 illustrates one embodiment of a system architecture for distributing index fragments to data processing devices.

As illustrated in FIG. 4, in one embodiment of the invention, the service 300 includes a search engine 410 which performs searches using an index 420 as in prior search systems. Additionally, as in prior systems, the service includes index generation logic 411 for continually updating the index 420 using new content identified from Web servers 100-102 (or other server types) on the Internet (or other network). In one embodiment, the index generation logic 411 is a Web Crawler or similar program. However, it should be noted that the underlying principles of the invention are not limited to any particular type of index generation logic 411.

Unlike prior systems, however, in one embodiment of the invention, the service 300 also includes search analysis logic 430 and index fragment generation logic 431 which operate to provide targeted search index fragments 441, 443 to each of the data processing devices 401, 402 after analyzing search requests 440, 442 received from the data processing devices, respectively. Specifically, in one embodiment, the search analysis logic 430 monitors new search requests 440, 442 and combines this information with prior search requests 432 received from each data processing devices 401, 402. Based on the content of the search requests, the search analysis logic 430 identifies index fragments within the full index 420 which are uniquely tailored to each data processing device. Once the index fragments are identified by the search analysis logic 430, the index fragment generation logic 411 responsively extracts the index fragments from the full index 420 and distributes the index fragments to each of the data processing devices 401-402. Subsequent searches are then performed locally on each of the data processing devices using the index fragments 441, 443.

Figure 5:
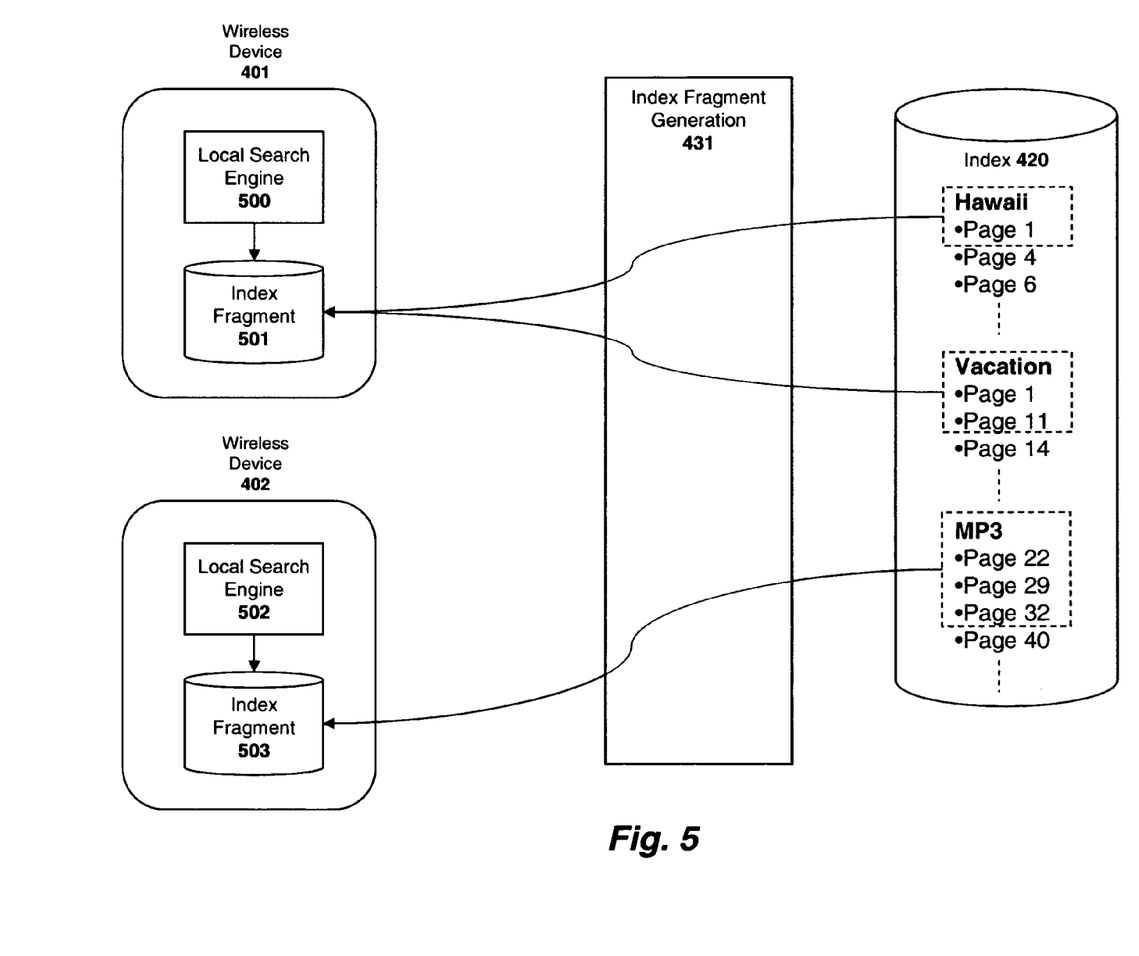
FIG. 5 illustrates index fragments distributed to exemplary data processing devices according to one embodiment.

By way of example, as illustrated in FIG. 5, if a user of data processing device 401 performs frequent searches for "Vacation" and "Hawaii," then the index fragment generation logic 431 extracts an index fragment 501 containing the tokens "Vacation" and "Hawaii," along with an identification of the Web pages (or the actual Web pages) associated with the Index. For the remainder of this document the term "page" refers to either an identifier of a Web page or other type of network content (e.g., a Uniform Resource Locator) or the actual Web page or other type of network content. Similarly, if the user of wireless device 402 performs frequent searches for "MP3" files, then the index fragment generation logic 411 extracts an index fragment 503 containing the token "MP3."

As indicated in FIG. 5, in one embodiment, only the most relevant pages associated with each token are transmitted to the data processing device. For example, only page 1 associated with the token "Hawaii" and pages 1 and 11 associated with the token "Vacation" are transmitted to wireless device 401; and only pages 22, 29 and 32 associated with the token MP3 are transmitted to wireless device 402.

In one embodiment, relatively more pages may be transmitted with tokens that are included in searches relatively more frequently. For example, if the user of wireless device 401 searches numerous times each day for "Hawaii" and "Vacation" then relatively more pages may be included as part of the index fragment 501. Conversely, if the user of wireless device 402 has only performed a few searches for "MP3" over the course of a few days, then relatively fewer pages may be sent within the index fragment 503.

Various algorithms may be employed by the search request analysis logic 430 to determine whether a particular token should be included within the index fragment and/or the number of pages to be included for each token. For example, in one embodiment, if a search is performed more than once over a specified time period (e.g., a day), then the token is automatically included within the index fragment along with a corresponding subset of pages. As the token is identified in more searches additional pages associated with that token are included as part of the index fragment.

In one embodiment, the search request analysis logic 430 determines whether a token should be included within the index fragment and/or the number of pages to be included for each token based on the number of times that token is detected from all users across a specified time window (e.g., the number of other users which have searched for the token within the past month and the results of the searches).

In one embodiment, user feedback is collected by the search request analysis logic 430 to determine whether a particular token should be included within the index fragment and/or the number of pages to be included for each token. For example, following a search, each user may be asked whether the search results were helpful. If a specified number of users indicate that the search was not helpful, then the search request analysis logic 430 may exclude the token from the index fragments sent to data processing devices. In one embodiment, the search request analysis logic 430 allows users to specify bookmarked searches. For example, a user may specify that certain tokens should always be included within the user's index fragments (e.g., "Harry Potter Movie," "Hawaii Vacations," etc). The search request analysis logic 430 will the automatically update the user's index fragment with the latest collected results for these tokens.

Various more complex algorithms may also be employed by the search request analysis logic 430. For example, in one embodiment, the search request analysis logic 430 employs a Bayesian classification to tokens in a similar manner that Bayesian techniques are employed within current spam filters. For example, based on the frequency with which certain tokens are detected within various time periods, weights may be assigned to the tokens. The weights may then be used to determine whether to include a particular token within an index fragment (e.g., with tokens having relatively greater weights being more likely to be included within index fragments than tokens with relatively lower weights)

Once generated, the index fragments 501, 503 are stored locally on each data processing device 401, 402. Subsequently, when a new search is entered by the user, a local search engine 500, 502 initially attempts to execute the search using the locally-stored index fragments 501, 503, respectively. If tokens for the search terms are identified within the local index fragments 501, 503, then the results of the search are readily provided to the user, without the need to query the search engine 410 on the service 300. Given the fact that the service 300 may support hundreds of thousands (or potentially millions) of users, the ability to offload search processing to each of the individual data processing devices significantly reduces the load on the service's primary search engine 410.

In one embodiment, if one or more of the search terms are not found locally within the index fragments 501, 503 on the data processing devices 401, 402, then the search request is sent to the primary search engine 410 on the service 300. The search request analysis logic 430 analyzes the search request in combination with prior search requests 432 to determine whether tokens and pages should be sent to the data processing devices 401, 402 to be available for future searches.

In one embodiment, the search request analysis logic 430 and index fragment generation logic 431 generate index fragments dynamically, in response to each new search request received from each data processing device 401, 402. Alternatively, or on addition, the search request analysis logic 430 and index fragment generation logic 431 periodically generate and upload the index fragments (e.g., once every 6 hours) based on search requests received since the last time the index fragment was generated and/or prior, stored search requests 432.

Figure 6:
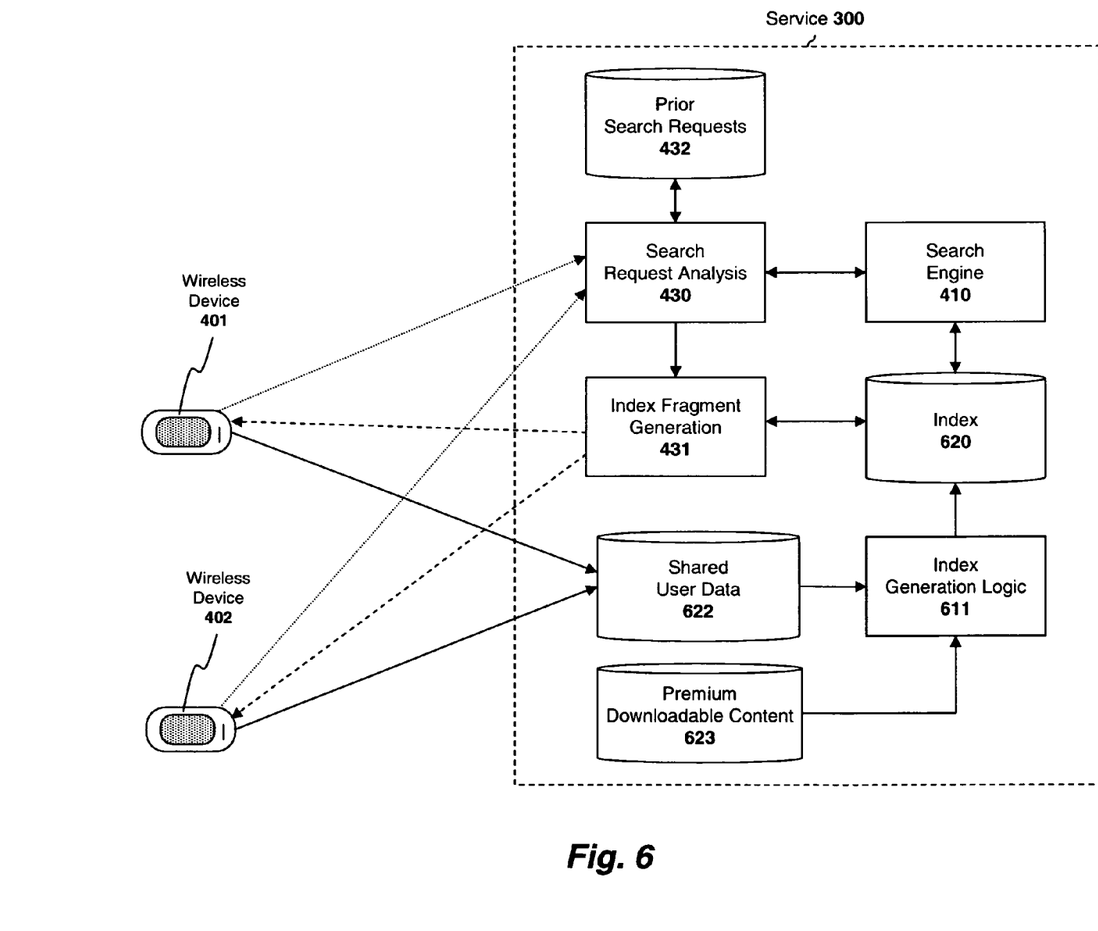
FIG. 6 illustrates one embodiment of the invention in which index fragments are generated different types of data.

The techniques describe above for generating index fragments may be used for a variety of applications other than general Internet searching. For example, as illustrated in FIG. 6, in one embodiment of the invention, the index generation logic 611 generates entries in the index 620 related to shared user data 622 and/or premium downloadable content 623. Specifically, with respect to the former, one embodiment of the service 300 allows users to share data. For example, in one embodiment, any data stored on the data processing device is automatically uploaded to the service 300. Thus, when a user takes a picture with a data processing device, the picture is automatically uploaded. If the user indicates that the picture data should be shared with other users (or specifies a group of users), then the index generation logic 611 updates the index 620 to include entries for the picture. The user may be asked to provide a description of the picture or other metadata so that the picture may be properly categorized by the index generation logic 611 (e.g., "trip to New Zealand"). The index fragment generation logic 431 then generates index fragments from this portion of the primary index 620 based on the analysis of search requests performed by the search request analysis logic 430, as described above. Another user may then search the index 620 and/or the local index fragments on the user's data processing device to locate and download the picture or other type of shared data. Various types of user data may be uploaded to the service and shared in this manner including but not limited to calendar data, audio files, video files, and address book/contact lists. In this manner, users of the service 300 become content providers to other users and the content is made searchable using the index distribution techniques described herein.

In one embodiment, users may explicitly request that certain data remain private (i.e., not shared) by other users. Moreover, the default setting for user data in one embodiment is "private." Users may then opt-in to allow their data to be shared with other specified users. In this embodiment, the index fragment generation logic 431 only includes tokens which are explicitly identified as data to be shared with other users within the index fragments sent to other users.

As used herein, "premium downloadable content" includes ringtones, applications, wallpaper, themes, and any other content offered to the user by the service 300 for purchase. With respect to the premium downloadable content 623, current data services push a catalog of purchasable content to data processing devices. Users may then browse through the catalog to identify and purchase content such as ring tones and executable applications. In some instances a new catalog is pushed out to the data processing devices each day, thereby consuming a significant amount of network bandwidth.

As illustrated in FIG. 6, in one embodiment of the invention, information related to the downloadable content 632 is incorporated into the index 620 by the index generation logic 611. In addition, as in the embodiments described above, the index fragment generation logic 431 generates index fragments from this portion of the primary index 620 based on an analysis of prior purchases and/or searches performed by the search request analysis logic 430. For example, if a user frequently purchases and/or searches for ringtones, the index fragment generation logic 431 may include a number of ringtones tokens within the index fragment sent to the user's wireless device. Similarly, if the user frequently purchases or searches for specific types of applications (e.g., new instant messaging applications), then the index fragment generation logic 431 may include tokens for these types of applications within the index fragment. Various other/additional types of content may be indexed in this manner while still complying with the underlying principles of the invention.

One notable benefit of the foregoing technique is that it provides a catalog of uniquely tailored information from which a user may search locally, thereby conserving processing resources on the service and increasing the likelihood that the catalog of purchasable content contains content of interest to the user. As such, the entire catalog does not need to be downloaded to the data processing device on a periodic basis (e.g., every day), thereby conserving network resources.

In one embodiment, the logic illustrated in FIGS. 3-6 is embodied in software executed on the data processing devices 401, 402 and service 300. However, the underlying principles of the invention are not limited to a software implementation. For example, the logic may be embodied in hardware, firmware, software or any combination thereof.

As used herein, a "network" refers to the public Internet as well as private networks such as the network employed within the data service 300 and other remote data services.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. The present invention may be downloaded as a computer program which may be transferred from a remote computer (e.g., a server) to a requesting computer (e.g., a client) via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A computer-implemented method comprising:
generating an index of content located over a network, the index including the content that correlates to search terms of prior search requests received from a wireless device;
receiving a search request from the wireless device connected to the network, the search request including at least one additional search term;
combining the search request with the prior search requests received from the wireless device, the search request including different subject matter than at least one of the prior search requests;
receiving new content from a user device, the new content having been categorized at the user device with descriptive metadata that corresponds to the additional search term received from the wireless device;
generating an index subset of the content based on a combination of the search request and the prior search requests, the index subset including the new content received from the user device and a quantity of similar content being increased in the index subset based on an increased frequency of a same subject matter used in the combination of said search requests; and
transmitting the index subset of the content to the wireless device that is configured to utilize the index subset locally for search processing.

2. The method as in claim 1 wherein the content comprises Web pages.

3. The method as in claim 1 wherein the content comprises shared content provided by users of other wireless devices.

4. The method as in claim 1 wherein the content comprises downloadable content.

5. The method as in claim 1 wherein generating the index comprises generating a reverse index including a plurality of tokens, each token having one or more pages associated therewith.

6. The method as in claim 1 wherein the network comprises Internet and one or more private networks.

7. A system comprising:
at least a memory and a processor configured to implement index logic that is configured to:
generate an index of content located over a network, the index including the content that correlates to search terms of prior search requests received from a wireless device;
receive a search request transmitted from the wireless device connected to the network, the search request including at least one additional search term;
combine the search request with the prior search requests received from the wireless device, the search request including different subject matter than at least one of the prior search requests;
receive new content from a user device, the new content having been categorized at the user device with descriptive metadata that corresponds to the additional search term received from the wireless device;
generate an index fragment of the content from a combination of the search request and at least one of the prior search requests, the index fragment including the new content received from the user device and a quantity of similar content being increased in the index subset based on an increased frequency of a same subject matter used in the combination of said search requests; and
a service configured to transmit the index fragment of the content to the wireless device that is configured to utilize the index fragment locally for search processing.

8. The system as in claim 7 wherein the content comprises Web pages.

9. The system as in claim 7 wherein the content comprises shared content provided by users of other wireless devices.

10. The system as in claim 7 wherein the content comprises downloadable content.

11. The system as in claim 7 wherein generation of the index comprises generating a reverse index including a plurality of tokens, each token having one or more pages associated therewith.

12. The system as in claim 7 wherein the network comprises Internet and one or more private networks.

13. A computer-readable storage medium having program code stored thereon which, when executed by a computer, causes the computer to:
automatically generate an index of content located over a network, the index including the content that correlates to search terms of prior search requests received from a wireless device;
receive a search request from the wireless device connected to the network, the search request including at least one additional search term;
combine the search request with the prior search requests received from the wireless device, the search request including different subject matter than at least one of the prior search requests;
receive new content from a user device, the new content having been categorized at the user device with descriptive metadata that corresponds to the additional search term received from the wireless device;
generate an index subset of the content based on a combination of the search request and at least one of the prior search requests, the index subset including the new content received from the user device and a quantity of similar content being increased in the index subset based on an increased frequency of a same subject matter used in the combination of said search requests; and transmit the index subset of the content to the wireless device that is configured to utilize the index subset locally for search processing.

14. The computer-readable storage medium as in claim 13 wherein the content comprises Web pages.

15. The computer-readable storage medium as in claim 13 wherein the content comprises shared content provided by users of other wireless devices.

16. The computer-readable storage medium as in claim 13 wherein the content comprises downloadable content.

17. The computer-readable storage medium as in claim 13 wherein generation of the index comprises generating a reverse index including a plurality of tokens, each token having one or more pages associated therewith.

18. The computer-readable storage medium as in claim 13 wherein the network comprises Internet and one or more private networks.

19. The method as in claim 1 wherein the index subset of the content includes requested content that has been searched for by multiple users over a specified duration of days.

20. The system as in claim 7 wherein the index fragment of the content includes requested content that has been searched for by multiple users over a specified duration of days.

21. The computer-readable storage medium as in claim 13 wherein the index subset of the content includes requested content that has been searched for by multiple users over a specified duration of days.

* * * * *